(12) United States Patent  (10) Patent No.: US 9,197,294 B2
Alicot et al.  (45) Date of Patent: Nov. 24, 2015

(54) TRANSPONDER TAG WITH IMPROVED TOLERANCE TO PRESENCE OF NEAR-FIELD LOADING MATERIAL

(71) Applicants: Jorge F. Alicot, Davie, FL (US); Richard L. Copeland, Lake Worth, FL (US)

(72) Inventors: Jorge F. Alicot, Davie, FL (US); Richard L. Copeland, Lake Worth, FL (US)

(73) Assignee: Tyco Fire & Security GmbH, Rheinfall (CH)

( * ) Notice: Subject to any disclaimer, the term of this patent is extended or adjusted under 35 U.S.C. 154(b) by 200 days.

(21) Appl. No.: 13/963,469

(22) Filed: Aug. 9, 2013

(65) Prior Publication Data

US 2014/0266622 A1 Sep. 18, 2014

Related U.S. Application Data

(60) Provisional application No. 61/778,026, filed on Mar. 12, 2013.

(51) Int. Cl.
*H04Q 5/22* (2006.01)
*H04B 5/00* (2006.01)
*G06K 19/077* (2006.01)
*H01Q 1/22* (2006.01)
*H01Q 1/52* (2006.01)
*H01Q 9/28* (2006.01)
*H01Q 23/00* (2006.01)

(52) U.S. Cl.
CPC ........ *H04B 5/0068* (2013.01); *G06K 19/07771* (2013.01); *G06K 19/07786* (2013.01); *H01Q 1/2225* (2013.01); *H01Q 1/52* (2013.01); *H01Q 9/285* (2013.01); *H01Q 23/00* (2013.01)

(58) Field of Classification Search
CPC ........................ H04B 5/0068; G06K 19/07794
USPC ............. 343/700 MS, 795; 342/30; 455/41.1, 455/41.2; 235/491–493, 488; 340/572.7, 340/10.1
See application file for complete search history.

(56) References Cited

U.S. PATENT DOCUMENTS 6,060,815 A * 5/2000 Nysen .................... G01S 13/758
                                                    310/318
6,201,513 B1 * 3/2001 Ow .......................... H01Q 1/36
                                                    343/792.5

* cited by examiner

*Primary Examiner* — George Bugg
*Assistant Examiner* — Anthony D Afrifa-Kyei
(74) *Attorney, Agent, or Firm* — Robert J. Sacco; Carol E. Thorstad-Forsyth; Fox Rothschild LLP

(57) ABSTRACT

A mixing inlay (102) is provided which includes a first radiating element (110*a*), a second radiating element (110*b*), and a non-linear mixing component (112) connected between adjacent end portions (114*a*, 114*b*) of the first and second radiating elements. The mixing inlay is configured to receive a first exciter signal having a first frequency and a second exciter signal having a second frequency, and in response, to radiate a mixing product signal produced by the mixing inlay from the first and second exciter signals. A conductive parasitic element (116) is disposed within a near field of the re-radiating transponder. A distance provided between the conductive parasitic element and the radiating elements is varied over the length of the conductive parasitic element to enhance a sideband signal generated by the mixing inlay.

20 Claims, 5 Drawing Sheets

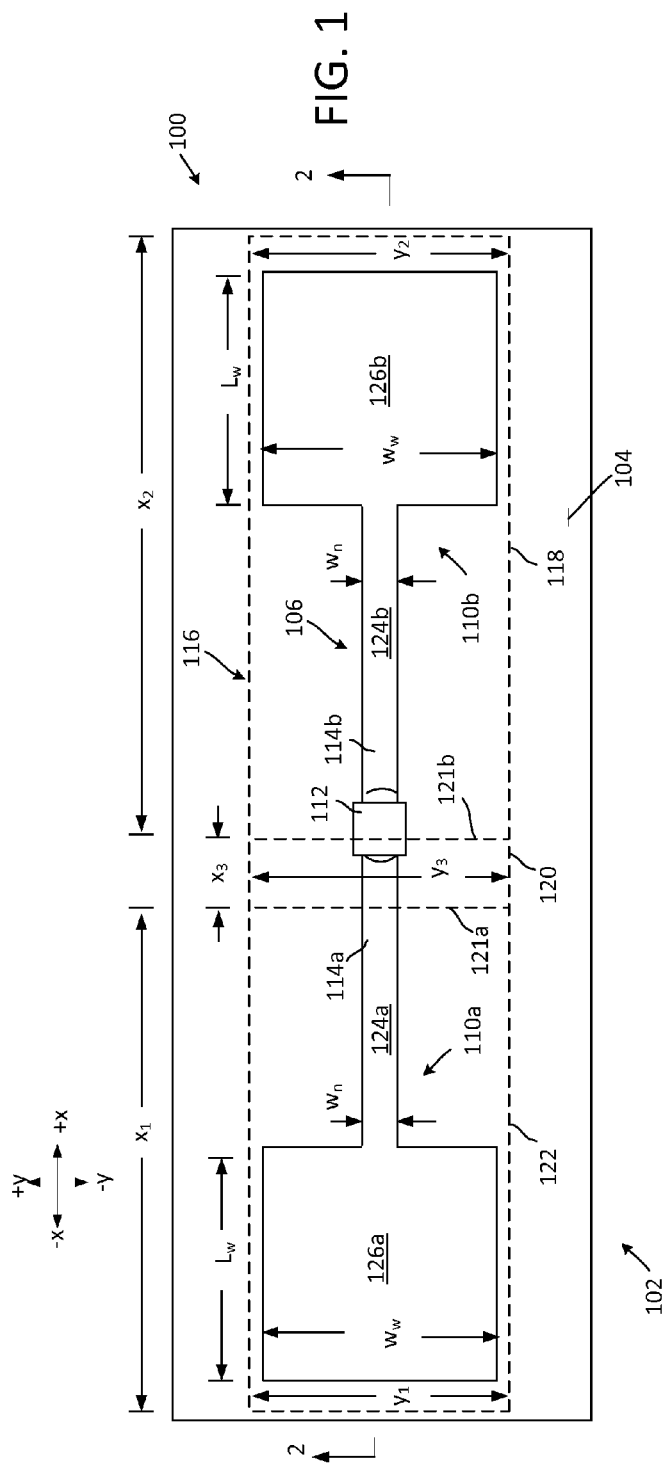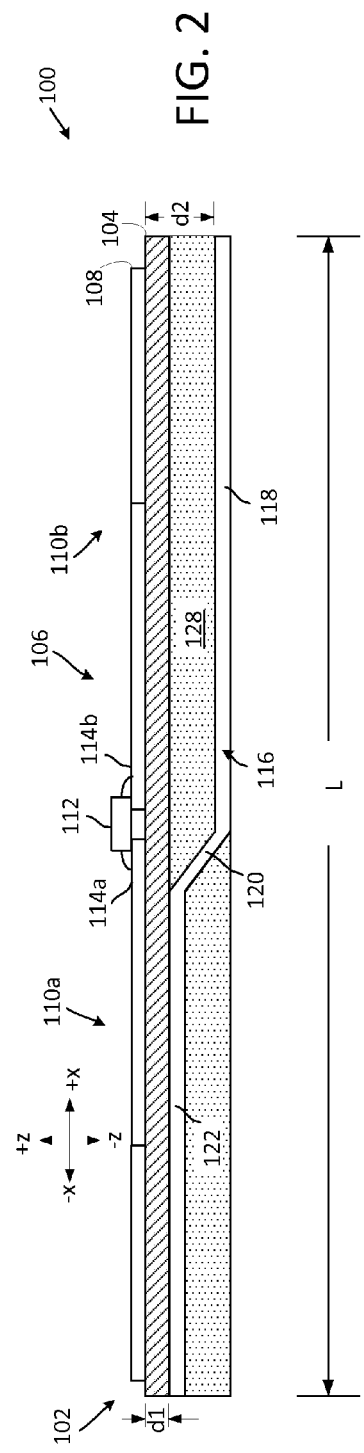

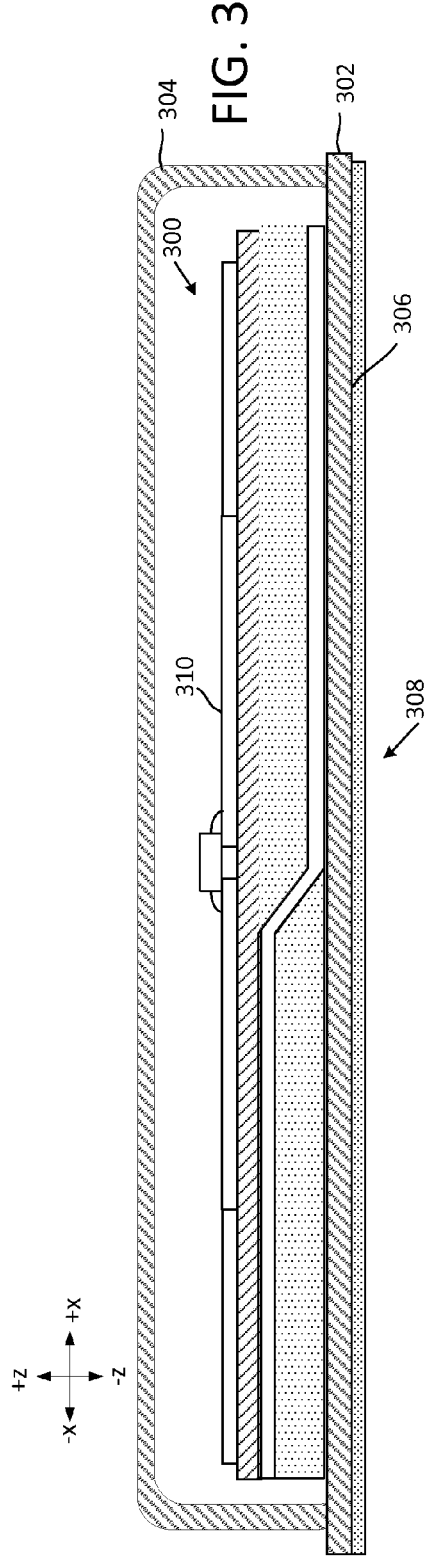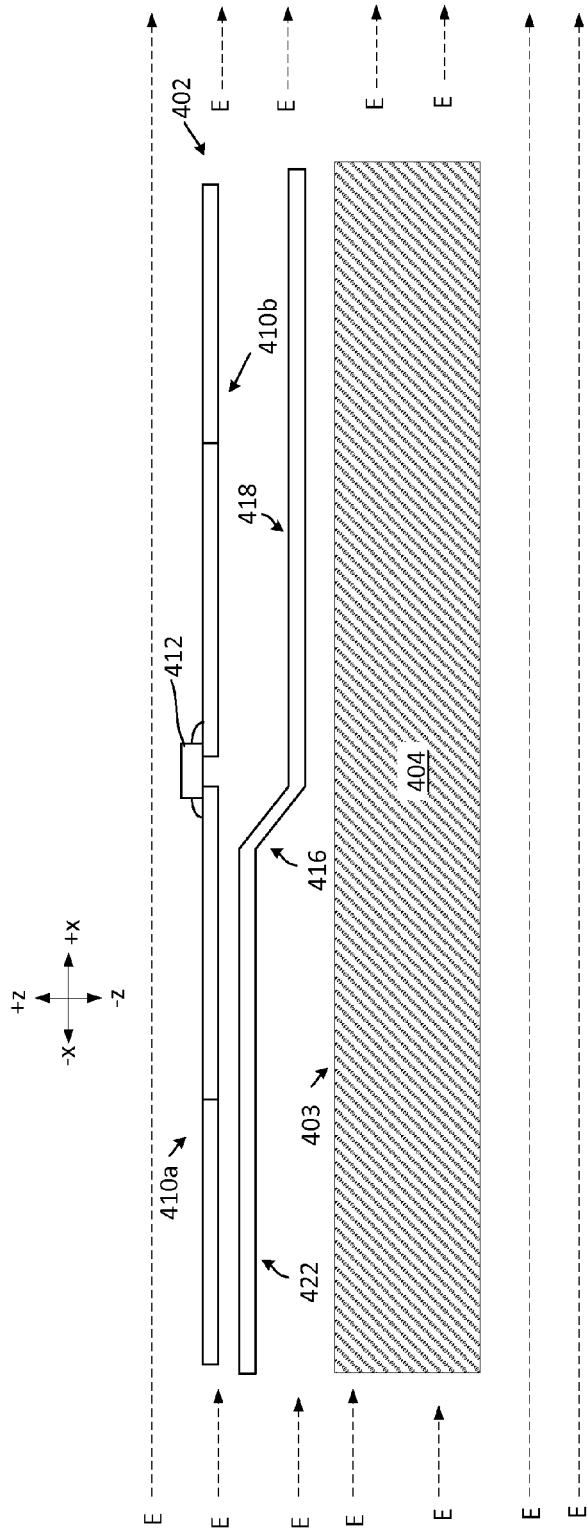

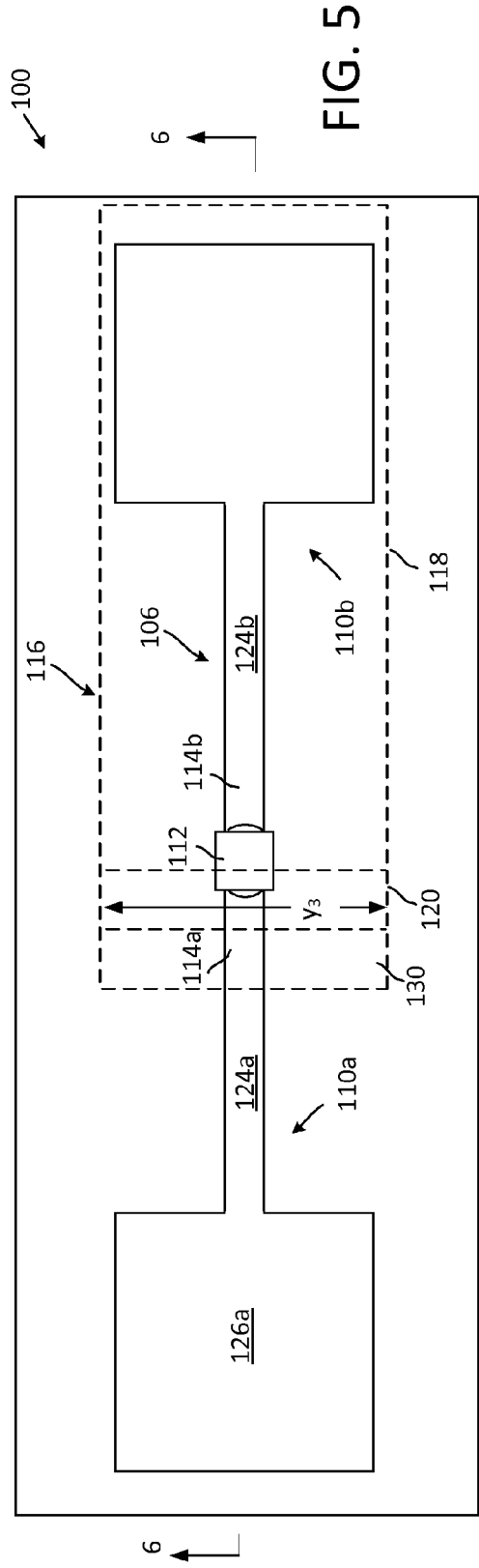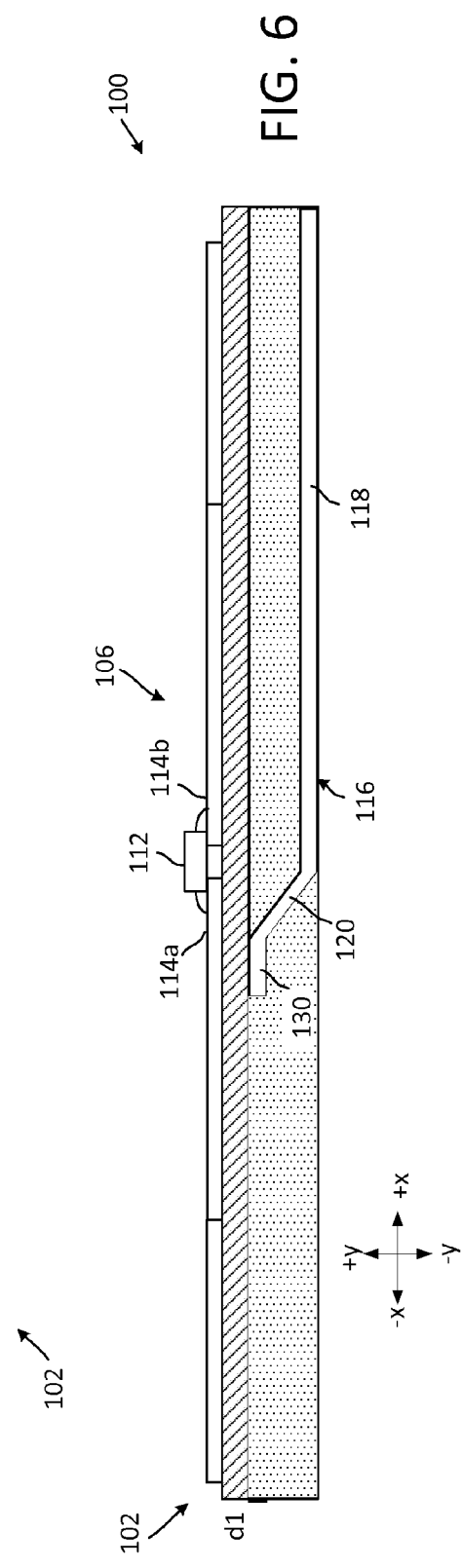

TRANSPONDER TAG WITH IMPROVED TOLERANCE TO PRESENCE OF NEAR-FIELD LOADING MATERIAL

CROSS REFERENCE TO RELATED APPLICATIONS

This application is a non-provisional application of U.S. Provisional Application No. 61/778,026 filed on Mar. 12, 2013, which is herein incorporated in its entirety.

BACKGROUND OF THE INVENTION

1. Statement of the Technical Field

The present invention relates generally to RFID transponder tags and more particularly to RFID transponder tags which are tolerant to electrical loading associated with adjacent materials.

2. Description of the Related Art

A known type of electronic article surveillance system includes a transmitter-receiver arrangement disposed alongside an area to be controlled. In such systems, a transmitter transmits a first signal into the controlled area. For example, the first signal can be an electromagnetic radio frequency (RF) signal in the UHF range. A separate transmitter produces a second signal within the same area. The second signal is usually an electric field of a substantially lower frequency and is commonly referred to as the E-field or electrostatic field. Re-radiators, typically comprising a dipole and a nonlinear element, are responsive to the first and second signals to produce RF signal at certain mixing frequencies which are derived from the first signal and the second signal. The RF signals present at one or both of the mixing frequencies can be detected by the receiver and used as a basis of detecting the presence of the re-radiator within the detection area. The RF frequencies produced by a mixing type re-radiator will generally include signals at the sum and difference of the first and second signal which are incident upon the device. As an example, a 900 MHz UHF signal and a 250 KHz E-field will produce a mixing component at 900.250 MHz and 899.750 MHz. An exemplary system similar to the type described herein is disclosed in U.S. Pat. No. 8,013,742 to Lian et al.

SUMMARY OF THE INVENTION

Embodiments of the invention concern a re-radiating transponder. The transponder includes a first radiating element formed of a first planar conductive sheet aligned with a first plane and comprising a first leg of an antenna. The transponder also includes a second radiating element formed of a second planar conductive sheet aligned with the first plane and comprising a second leg of the antenna. A non-linear mixing component is connected between adjacent end portions of the first and second radiating elements such that the first radiating element, the second radiating element and the non-linear mixing component comprise a mixing inlay. A conductive parasitic element is positioned within a near field of the re-radiating transponder at a location spaced apart from the second radiating element and separated by a distance extending in a direction transverse to the first plane. The distance is varied over a length of the conductive parasitic element so as to selectively vary an affect of the parasitic element upon the first and second radiating elements. The mixing inlay is configured to receive a first exciter signal having a first frequency and a second exciter signal having a second frequency. In response to the exciter signals the mixing inlay will radiate a mixing product signal produced by the mixing inlay from the first and second exciter signal. Notably, the presence of the conductive parasitic element improves the signal amplitude of the mixing product signal when the transponder is placed adjacent to a conductive object.

According to another aspect, the invention concerns a re-radiating transponder, comprising a base portion including an attachment surface to facilitate attachment of the transponder to an object which is to be monitored. A mixing inlay is provided which includes a first radiating element, a second radiating element, and a non-linear mixing component connected between adjacent end portions of the first and second radiating elements. The mixing inlay is configured to receive a first exciter signal having a first frequency and a second exciter signal having a second frequency, and in response, to radiate a mixing product signal produced by the mixing inlay from the first and second exciter signals. The mixing inlay further includes a conductive parasitic element disposed within a near field of the re-radiating transponder at a location between a first plane defined by the first and second radiating elements and a second plane defined by the attachment surface. A distance provided between the conductive parasitic element and the first plane is varied over the length of the conductive parasitic element to enhance a sideband signal generated by the mixing inlay.

The invention also concerns a method for reducing attenuation of a re-radiated signal produced by a re-radiating transponder. The method involves disposing in a first plane a first radiating element formed of a first planar conductive sheet and a second radiating element formed of a second planar conductive sheet. The method also includes providing a non-linear mixing component connected between adjacent end portions of the first and second radiating elements. The first and second radiating elements and the non-linear component as described will comprise a mixing inlay. The method further involves receiving at the mixing inlay a first exciter signal having a first frequency and a second exciter signal having a second frequency, and in response, radiating a mixing product signal produced by the mixing inlay from the first and second exciter signals. The method also involves reducing an attenuation of the mixing product signal under conditions where the re-radiating transponder is positioned on or adjacent to a conductive material. This reduction in attenuation is obtained by positioning a conductive parasitic element within a near field of the re-radiating transponder at a location disposed between the first plane and the conductive material, and further includes varying a distance between the conductive parasitic element and the first plane over a length of the conductive parasitic element.

BRIEF DESCRIPTION OF THE DRAWINGS

Embodiments will be described with reference to the following drawing figures, in which like numerals represent like items throughout the figures, and in which:

FIG. 1 is a top view of a mixing inlay which is useful for understanding the present invention.

FIG. 2 is a cross-sectional view of the mixing inlay in FIG. 1, taken along line 2-2.

FIG. 3 is a cross-sectional view of a mixing inlay disposed in a housing which includes a base and an attachment surface.

FIG. 4 is a conceptual drawing that is useful for understanding the operation of a conductive parasitic element for reducing attenuation of certain signals in mixing inlay.

FIG. 5 shows a top view of a first alternative embodiment which is useful for understanding the invention.

FIG. 6 shows a cross sectional view of the first alternative embodiment in FIG. 5, taken along line 6-6.

DETAILED DESCRIPTION OF THE INVENTION

Figure 7:
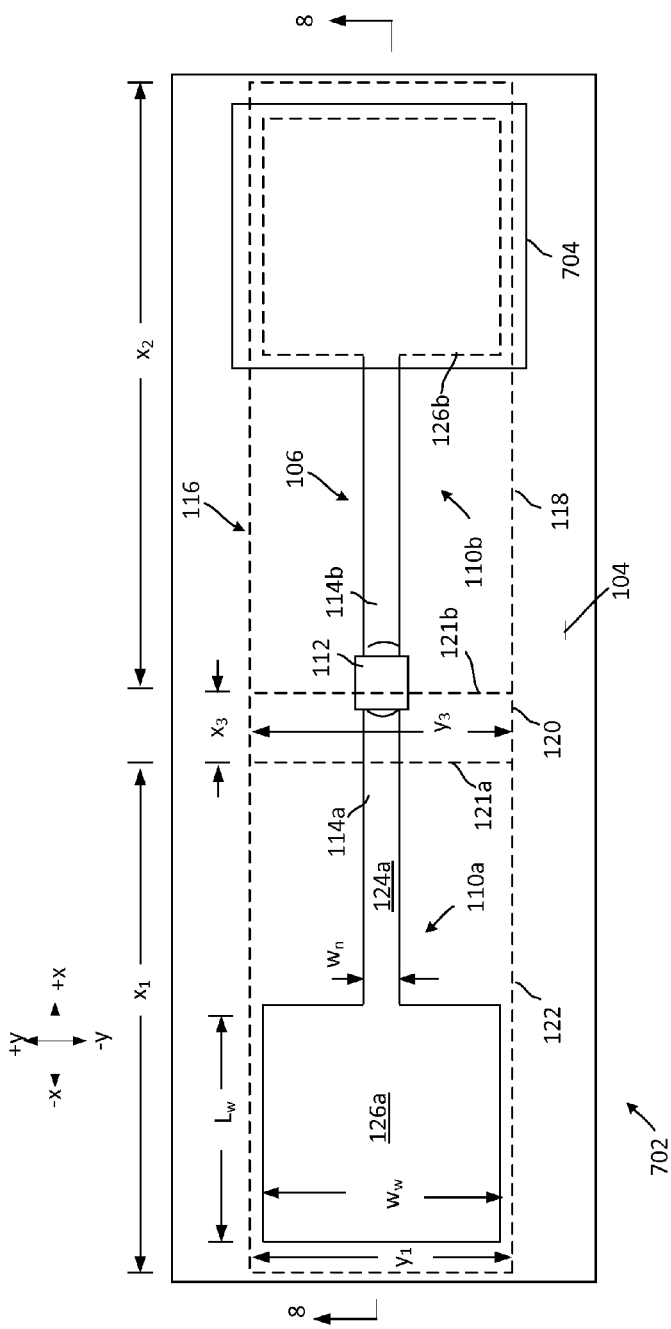
FIG. 7 is a top view of a second alternative embodiment which is useful for understanding the invention.

This invention concerns re-radiators used in RFID systems, and more particularly mixing type re-radiators which are sometimes referred to as mixing signal transponders. A re-radiator as described herein provides improvements in signal performance, particularly under conditions where the re-radiator is placed on metal surfaces, the human body, or other materials, which shall hereinafter be referred to as loading materials. Conventional transponders used in RFID systems generally consist of a graphic overlay portion and an inlay portion. The portion referred to as the inlay is the electrically functional portion of the device. The inlay generally includes two or more antenna elements and, in the case of a mixing transponder, a nonlinear device which is used for performing signal mixing. An inlay that performs mixing operations as described herein is sometimes referred to as a mixing inlay.

The functional antenna portions of a mixing inlay are conventionally formed of a thin conductive metal layer disposed on a dielectric substrate. The conductive layer usually extends in two directions across a surface of the substrate (e.g. length and width). The conductive layer has minimal thickness and the antenna elements typically do not extend in a direction transverse to the surface or thickness of the substrate. In an embodiment of the invention, the mixing inlay comprises a three-dimensional (3D) arrangement of antenna elements, including a parasitic element which can be formed of a conductive foil, for example. Advantageously, the parasitic element has a 3D shape which improves the E-field response of the mixing inlay under conditions where the transponder is placed on metallic objects or other loading materials. Conventional mixing inlays lack the spatial relative positioning of the various antenna elements (including the parasitic element) as described herein and therefore do not offer this advantage.

Referring now to FIGS. 1 and 2, there is shown an exemplary re-radiating transponder 100 which is comprised of a mixing inlay 102. The mixing inlay is configured to receive a first exciter signal having a first frequency and a second exciter signal having a second frequency. In response to these exciter signals, a mixing product signal is produced by the mixing inlay from said first and second exciter signal. The mixing inlay 102 includes an antenna portion 106 which is formed on a dielectric substrate 104. The antenna portion 106 includes one or more antenna radiating elements which have dimensions and geometries which are selected to facilitate receiving of the first and second exciter signals.

The dielectric substrate 104 is advantageously a material which exhibits relatively low loss in the presence of RF signals. For example, the dielectric substrate can be formed of material such as mylar, paper, plastic, PET polyester, or polyimide. The substrate advantageously has a planar configuration extending in the x and y directions. The substrate may be rigid, semi-rigid substrate or flexible. If formed of a flexible material, the substrate is advantageously supported by means of other, more rigid materials (not shown in FIGS. 1 and 2) so that the substrate maintains a generally planar configuration.

A conductive layer 108 is disposed on the surface of the substrate 104 to form the antenna portion 106. The conductive layer 108 can be formed of any suitably conductive material such as copper (Cu) or a suitable form of conductive ink. The antenna portion 106 includes first and a second antenna radiating elements 110a, 110b. The first and second radiating elements have a generally planar form extending in the x and y directions, parallel to a major surface of the dielectric substrate 104. The first and second radiating elements respectively correspond to first and second legs of the antenna portion 106. A non-linear mixing component 112 is connected between adjacent end portions 114a, 114b of the first and second radiating elements 110a, 110b. An exemplary non-linear mixing component 112 includes a diode. Diodes which are generally suitable for this purpose include Schottky, junction or PIN type diodes.

The first and second conductive radiating elements can include any suitable antenna elements which are capable of generating a mixing voltage difference across the non-linear mixing component 112 when exposed to the first and second exciter signals. Radiating elements of this kind are well known in the art and the radiating element shown in FIGS. 1 and 2 are merely shown as one possible example, and not by way of limitation. In the embodiment shown, each radiating element includes a first section 124a, 124b of linear elongated form extending away from the nonlinear mixing component and having a relatively narrow transverse dimension $w_n$.

The radiating elements 110a, 110b also include a second section 126a, 126b extending from the first section (at a location distal from the non-linear mixing component 112). The second section will have a relatively wide transverse dimension $w_w$ that is wider than the narrow transverse dimension of the first section 124a, 124b. In the embodiment shown, the first and second sections of each radiating element extend along a common axis aligned with the x direction. However, the invention is not limited in this regard and in some embodiments, the first section 124a, 124b can have a folded, serpentine, meandering or coiled form. The inventive arrangements are intended to include all such potential geometries. For example, a pair of radiating elements as described herein can have a form similar to those shown in U.S. Pat. No. 4,736,207, the disclosure of which is incorporated herein by reference.

The first and second conductive radiating elements 110a, 110b essentially comprise a dipole antenna. As such, the overall length and dimensions of the radiating elements are advantageously chosen so that they exhibit a characteristic resonance at a frequency of a first RF signal (e.g. a frequency in the UHF range). Those skilled in the art will appreciate that the overall physical length of the two radiating elements 110a, 110b can be varied while still achieving a particular resonance frequency. For example, this can be accomplished with capacitive end loading which involves selectively controlling the width $W_w$ and length $L_w$ of the second sections 126a, 126b. The overall length of the two radiating elements 110a, 110b can be shortened by making the transverse width $W_w$ wider than the transverse width $W_n$. This widening of the second section 126a, 126n can have the further advantage of improving the responsiveness of the radiating elements 110a, 110b to an applied electric field (e.g., the second exciter signal) as hereinafter described.

Radiating elements 110a, 110b as shown can be effective for concurrently receiving a first RF signal in the UHF frequency range (e.g. a 900 MHz electromagnetic field) and a second signal in the form of a relatively low frequency electrostatic field (e.g. 250 kHz). The electrostatic field (E-field) can in some embodiments be modulated so as to contain additional information. The two signals concurrently received in the radiating elements 110a, 110b will generate a voltage difference which is applied by the radiating elements to the non-linear mixing component 112. In response, the non-linear mixing component 112 generates upper and lower sideband signals (e.g. sum and difference signals) as is known. More particularly, the nonlinearly changing capacitance of the non-linear mixing component 112 produces a mixing component that emerges as signal components based on the sum and difference of the UHF and E-field frequencies. As an example, a 900 MHz UHF signal and a 250 KHz E-field will produce a mixing component (sidebands signals) at 900.250 MHz and 899.750 MHz. One or both of these sideband signals can then be received by a receiving or detecting device. An exemplary antenna similar to the foregoing is described in U.S. Pat. No. 4,736,207, the disclosure of which is incorporated herein by reference.

The mixing inlay 102 further includes a conductive parasitic element 116 which is offset from the plane of the first and second radiating elements in the −z direction. The conductive parasitic element 116 is formed of a thin layer of conductive material or mesh. For example in an embodiment of the invention, a conductive foil can be used for this purpose. The conductive foil can be formed of copper (Cu), aluminum (Al) or any other suitable conductive material. The conductive parasitic element 116 is shown in phantom in FIG. 1 since it is disposed beneath the dielectric substrate 104.

The conductive parasitic element 116 is arranged to reduce an attenuation of the mixing product signal produced by the mixing inlay 102 under conditions where the re-radiating transponder 100 is positioned on or adjacent to a loading material (not shown). The conductive parasitic element 116 is positioned within a near field of the first and second radiating elements 110a, 110b comprising the re-radiating transponder 100. The concept of a near field with respect to radiating antenna elements is well known in the art and therefore will not be described here in detail. However, for purposes of the present invention, the near field can be understood to include regions that are generally less than about 20 millimeters from the plane defined by the first and second radiating elements 110a, 110b.

As shown in FIG. 2, the conductive parasitic element 116 is disposed at a location spaced from the first and second radiating elements element by a distance extending in the −z direction (transverse to the plane defined by the first and second radiating elements 110a, 110b). It can be observed in FIG. 2 that this distance or spacing is varied over the length L of the conductive parasitic element 116 corresponding to the +/−x direction. More particularly, the distance can vary between a first distance d1 and a second distance d2.

As may be observed in FIGS. 1 and 2, the conductive parasitic element 116 has several portions, each having a generally planar form. For example, the conductive parasitic element 116 can include a lower planar portion 118, a transitional planar portion 120, and an upper planar portion 122. As best shown in FIG. 1, the upper planar portion 122 is at least partially disposed beneath the first radiating element 110a, and the lower planar portion 118 is at least partially disposed beneath the second radiating element 110b. The upper and lower planar portions have a length and width extending in the x and y directions, respectively and each is generally parallel to the plane defined by the first and second radiating elements 110a, 110b. Accordingly, the distance between the plane defined by radiating element 110a and the plane defined by the upper planar portion 122, is substantially constant. Similarly, the distance between the plane defined by the radiating element 110b and the lower planar portion 118 is substantially constant.

In contrast, it can be observed in FIG. 2 that the transitional planar portion 120 comprises a transition zone. In this transition zone, the distance between the conductive parasitic element 116 and the plane defined by the first and second radiating elements varies substantially at different position along the length L of the conductive parasitic element. In some embodiments, the transitional planar portion 120 can be substantially aligned with the z axis, so that it is forms an angle of about 90° relative to the planes defined by the upper and lower planar portions 122, 118. Still, the invention is not limited in this regard and a less abrupt transition with reduced slope can also be provided as illustrated in FIG. 2. The transitional planar portion can extend a predetermined distance in the z direction. For example, the transitional planar portion 120 can extend as little as 1 mm or as much as 20 mm in the z direction. In one embodiment, the transitional planar portion 120 can extend about 2 mm. In another embodiment, the transitional planar portion can extend about 5 mm in the z direction. Results of computer simulations show that for distances beyond about 5 mm, the additional benefit provided by the parasitic element begins to diminish such that added step size beyond about 5 mm does not measurably improve UHF signal coupling. Accordingly, a distance 2 mm≤d2−d1≤10 mm is currently preferred. Still, it will be appreciated that the invention is not limited in this regard and other distance ranges are also possible. The transitional planar portion 120 is advantageously arranged so that the transition in slope 121b toward the +z direction begins approximately at a location corresponding to the location of the non-linear mixing component 112. The transition to this upward slope can also occur at a location corresponding approximately to end portion 114a. Degraded performance will be observed if the upward slope is initiated in an area aligned with the second radiating element 110b. The transition in slope 121a from the upper planar portion 122 toward the −z direction is advantageously at a location aligned with or spaced in the −x direction relative to the non-linear mixing component 112. A length $x_3$ of the transitional planar portion 120 will depend on its slope along the x axis and a distance (d2−d1) between the upper and lower planar portions 122, 118.

The lower planar portion 118 is substantially aligned with or centered on the second radiating element 110b when viewed in the z direction as shown in FIG. 1. It can be observed that the lower planar portion 118 has a maximum length dimension $x_2$ and a maximum width dimension $y_2$ that are respectively at least substantially co-extensive in the x and y directions with a length and width dimension of the second radiating element 110b. This arrangement is shown in FIG. 1 wherein the lower planar portion 118 extends just beyond the length and maximum width of the second radiating element 110b. The maximum length dimension $x_2$ of the lower planar portion 118 may extend up to or slightly beyond the location of non-linear mixing component 112 so as to meet with the transitional planar portion at 12 lb. The alignment of the second radiating element with the lower planar portion can be arranged so that the second radiating element 110b is substantially contained within the boundaries of the lower planar portion 118. However, the lower planar portion 118 can have dimensions $x_2$, $y_2$ that are slightly smaller or larger (e.g. up to 20% smaller or larger) than the second radiating element 110b. If the lower planar portion 118 is smaller than the second radiating element 110b, some degradation in transponder performance can be expected under certain conditions as hereinafter described. It is also possible for the lower planar portion 118 to be slightly offset in the x or y direction relative to the second radiating element 110b. Accordingly, the substantial alignment described herein can include scenarios in which portions of the second radiating element 110b extend slightly beyond the limits of the lower planar portion 118 in the x or y direction.

The upper planar portion 122 is substantially aligned with or centered on the first radiating element 110a, when viewed in the z direction as shown in FIG. 1. Also, the upper planar portion 122 has a length and width dimension $x_1$, $y_1$ that are respectively at least substantially co-extensive with a length and width dimension of the first radiating element 110a. This arrangement is shown in FIG. 1 wherein the upper planar portion 122 extends just beyond the length and maximum width of the first radiating element. However, the invention is not limited in this regard and the upper planar portion 122 can have dimensions $x_1$, $y_1$ that are slightly smaller or larger (e.g. up to 20% smaller or larger) than the first radiating element 110a. It is also possible for the upper planar portion 122 to be slightly offset in the x or y direction relative to the first radiating element 110a so that the first radiating element is not entirely within the boundaries defined by the upper planar portion 122. Accordingly, the substantial alignment described herein can include scenarios in which portions of the first radiating element 110a extend somewhat beyond the limits of the upper planar portion 118 in the x or y direction.

In FIG. 1, the $y_1$ and $y_2$ dimensions are shown to be approximately equal. Such an arrangement can be convenient in scenarios where the first and second radiating elements 110a, 110b have equal dimensions. Still, it should be appreciated that it is not necessary for $y_1$ and $y_2$ to be equal and in certain scenarios it may be acceptable or advantageous for these dimensions to be different.

The purpose of the conductive parasitic element 116 is to ensure that different electric fields strengths are experienced by the first antenna radiating element 110a as compared to the second radiating element 110b when the mixing inlay 102 is disposed adjacent to a loading material (especially a conductive material) within an electric field as shown in FIG. 4. This effect can be achieved (although perhaps to a lesser extent) when the transitional planar portion 120 is offset somewhat from the location shown in FIGS. 1 and 2. Accordingly, it should be understood that the invention includes embodiments in which the transition planar portion 120 is located at positions along the x axis different from those described herein, provided that the purposes of the conductive parasitic element as described are achieved to a satisfactory extent.

A width $y_3$ of the transitional planar portion 120 can be at least equal to the width dimension of the upper and/or lower planar portions 122, 118. Still, the invention is not limited in this regard and other variations are possible provided that the conductive parasitic element has the desired effect of creating a modified electric field potential in the volume around the first and second radiating elements 110a, 110b as described herein. In particular, the conductive parasitic element should cause the electric field experienced by the first radiating element 110a to be different as compared to the electric field experienced by the second radiating element 110b. This difference in potential ensures that a sufficient drive voltage will be generated and applied to the non-linear mixing component 112 for purposes of generating a mixing signal response.

A dielectric spacer element 128 is advantageously disposed between the second conductive radiating element 110b and the lower planar portion 118 forming the conductive parasitic element. The dielectric spacer element 128 can be formed of any suitable dielectric material having a suitable thickness. Dielectric materials having relatively low loss are of course preferred for this purpose. The dielectric spacer element 128 should have a thickness sufficient to fill in the space resulting from the difference between d2 and d1, so that a substantially continuous support surface is provided beneath the dielectric substrate 104 along its length.

Referring now to FIG. 3, there is shown a mixing inlay 300 similar to that described with respect to FIGS. 1 and 2. The mixing inlay 300 can be provided with at least one structural member to lend additional physical support and/or protection to the mixing inlay. For example a rigid or semi-rigid base 302 can be formed of a suitable low loss dielectric material. The base 302 can be disposed beneath the mixing inlay, i.e., in −z direction relative to the mixing inlay 300 in FIG. 3 so that the conductive parasitic element is disposed between the antenna portion and the base. A similar structural member (not shown) can be disposed on an opposing side of the inlay, adjacent to antenna portion 310. The mixing inlay 300 can be completely or partially enclosed in a protective housing 304 which can be separate or integral with the base 302. The housing is formed of any suitable low loss dielectric material. An attachment surface 306 can be defined on a portion of the housing 304. The attachment surface can advantageously include an adhesive or other structural element suitable for attaching the mixing inlay to an object which is to be detected in an EAS detection zone.

In practice, a mixing transponder can be attached to an object to be detected in an EAS detection zone. In some scenarios, the material forming the object can have a loading effect upon a conventional mixing inlay and thereby prevent the transponder from producing a mixing signal response when exposed to first and second transponder exciter signals. Referring now to FIG. 4 a scenario is illustrated in which a mixing inlay 402 is disposed adjacent to a conductive material 404. Mixing inlay 402 has a structure and arrangement which is similar to mixing inlay 102. In order to facilitate disclosure of the inventive concepts herein, the dielectric portions of the mixing inlay are not shown in FIG. 4. However, it should be understood that the mixing inlay 402 can be attached to a conductive material 404 along an attachment surface similar to attachment surface 306. An adhesive or some other suitable structure can be used to secure the mixing inlay to the conductive material. In an exemplary embodiment, the conductive material in FIG. 4 can be comprised of a portion of an object which is to be tracked or detected within a detection zone of an RFID system. For example, the conductive material 404 can comprise a portion of an object formed of a highly conductive metal.

In the scenario illustrated in FIG. 4, it is assumed that the mixing inlay is disposed within a detection zone in which the first and second signals (E-field and UHF field) have been injected. The E-field in this scenario is represented by E vectors as shown in FIG. 4. Under the conditions as shown, the E-field and electromagnetic field associated with the UHF signal are each loaded by the conductive material 404. The voltage produced across the mixing component 412 will depend on the E-field gradient experienced by the radiating elements 410a, 410b. The well-known equation which explains this relationship is $V = \int E \cdot dl$, where E is the electric field integrated across the mixing component (element 412).

When a conventional mixing inlay is positioned adjacent to a conductive material 404, substantial performance degradation is noted with respect to the amplitude of re-radiated sideband signals. This performance degradation is apparently due to the loss of E-field gradient as the conductors forming the radiating elements come in close proximity to the conductive material. The reduction in E-field gradient may be explained as a capacitive coupling to the non gradient E-field at the surface 403 of conductive material 404. The constant voltage across the conductive material opposes the generation of an E-field on its surface. As the mixing inlay is moved closer to the surface 403, the free space E-field gradient experienced by the radiating elements 410a, 410b is reduced. Accordingly, the conductive parasitic element 416 of the mixing inlay in the scenario shown is intended to help provide an E-field gradient across the mixing element when placed on loading surfaces, such as metal. The expected operation is that the E-field on one side of the mixing component 412 is better coupled to the loading surface through conductive parasitic element 416. The E-field on the other side of the mixing element 412 is less tightly coupled to the loading surface and is additionally affected by the E-field associated with the first and second signals. More particularly, the upper planar portion of the conductive parasitic element 416 will effectively couple the first radiating element 410a to the conductive material 404. In contrast, the lower planar portion 418 will have less effectively coupled to the second radiating element 410b. This difference in effective coupling will enhance an E-field gradient experienced as between the first and second radiating elements. Consequently, a larger voltage can be applied across the non-linear mixing component 412, even under conditions where the mixing inlay 402 is adjacent to a highly conductive material. Accordingly, a larger voltage differential is generated by the first and second radiating elements 410a, 410b in the scenario shown in FIG. 4 as compared to a similar scenario which is absent of the conductive parasitic element 416. The conductive parasitic element will have some de-tuning effect upon the first and second radiating elements 410a, 410b, but the overall response of the mixing inlay to the first and second exciter signals is nevertheless improved.

Referring now to FIGS. 5 and 6, there is shown a first alternative embodiment in which the dimensions of an upper planar portion 130 have been substantially reduced relative to the size of the lower planar portion 118. As can be observed in FIGS. 5 and 6, the length of the upper planar portion 130 has been significantly reduced in the x direction corresponding to the length of the conductive parasitic element 116. A conductive parasitic element having a reduced length upper planar portion as shown, can facilitate reduced attenuation of radiated signals from the mixing transponder in the presence of a conductor. For example, the reduced length upper planar portion can extend a distance in the x direction which is less than 20% of the overall length of first radiating element 110a. Though not as effective for reducing attenuation as compared to the embodiment described in relation to FIGS. 1-4, the advantageous results obtained with the arrangement in FIGS. 5 and 6 have nevertheless been found to reduce attenuation of radiated sidebands and may provide satisfactory results in some scenarios. Although a small stub of upper planar portion 130 is shown in FIGS. 5 and 6, it should be appreciated that the upper planar portion 130 can also be eliminated entirely, and the conductive parasitic element 116 will still provide useful reductions in attenuation.

Figure 8:
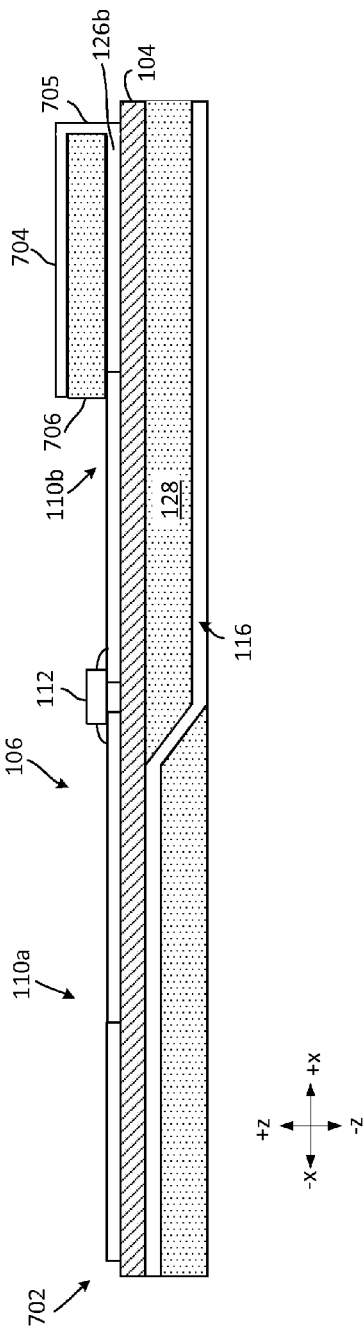
FIG. 8 is a cross-sectional view of the second alternative embodiment in FIG. 7, taken along line 8-8.

Referring now to FIGS. 7 and 8 there is shown a third alternative embodiment in which a shield element 704 has been provided to the basic configuration shown in FIGS. 1 and 2. The shield element 704 is positioned adjacent to the second section 126b, spaced apart in the +z direction. The shield element 704 is electrically connected to the second section 126b by connector element 705. The shield element and the connector element can each be formed of a thin layer of highly conductive material. For example, the conductive material can be a metal foil formed of copper (Cu) or Aluminum (Al). A spacer element 706 can be provided to maintain a distance between the shield element 704 and the second section 126b. The spacer element 706 is formed of a suitable low loss dielectric material. The shield element 704 can be provided to help decouple the second radiating element 110b from the effects of an adjacent conductive object. In such an embodiment the spacing between the shield element 704 and the second section 126b can be selected to be within the range of between about 2 mm and 20 mm, with a range between 2 mm and 10 mm currently being preferred. In other respects, the embodiment shown in FIGS. 7 and 8 will operate in a manner similar to that described herein with respect to the mixing inlay shown in FIGS. 1 and 2.

Figure 9:
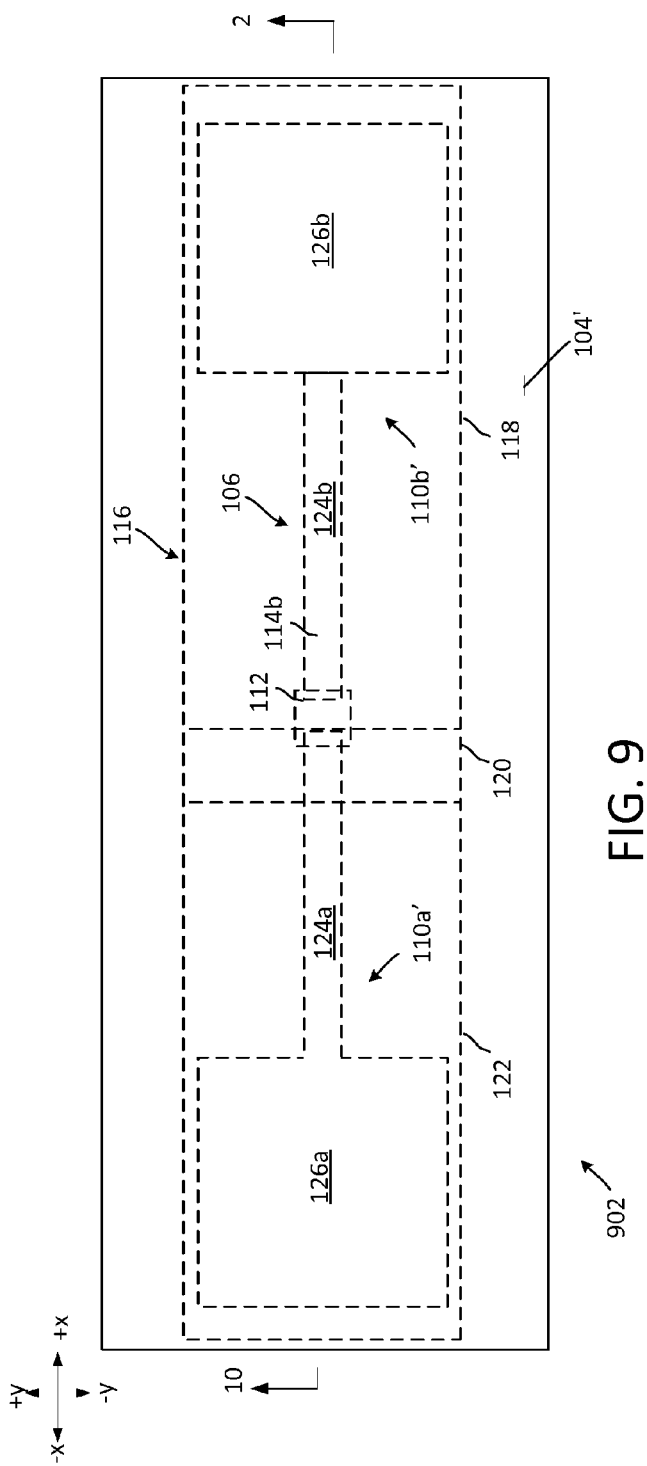
FIG. 9 is a top view of a third alternative embodiment of the invention.
Figure 10:
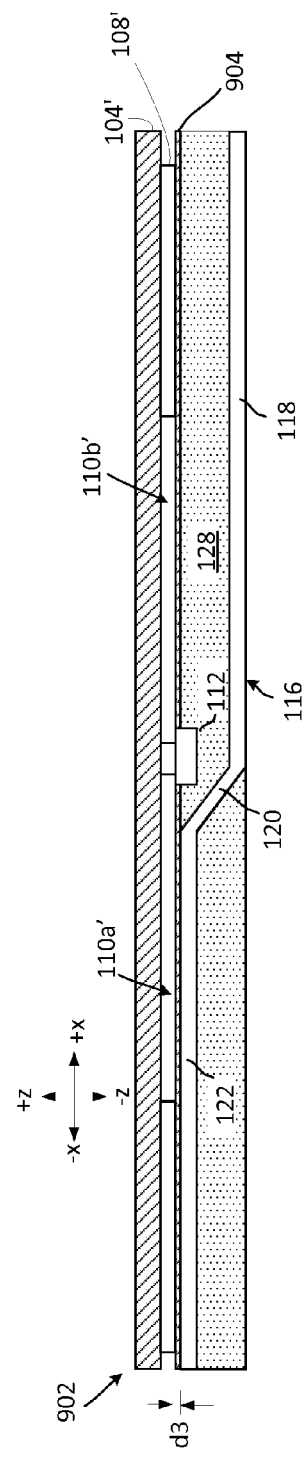
FIG. 10 is a cross-sectional view of the third alternative embodiment shown in FIG. 9.

Referring now to FIGS. 9 and 10, there is shown a fourth alternative embodiment comprising a mixing inlay 902. Mixing inlay 902 is similar to mixing inlay 102 except that the substrate 104' on which the radiating elements 110a', 110b' are disposed is re-oriented so that a conductive layer 108' from which the radiating elements are formed faces toward the conductive parasitic element 116, rather than away from the conductive parasitic element. In this embodiment, a small distance d3 can be provided between the upper planar portion 122 and the first radiating element 110a'. A thin dielectric insulating layer 904 can be provided between the upper planar portion 122 and the first radiating element 110a' to control this spacing. However, the invention is not limited in this regard and in some embodiments the dielectric insulating layer 904 can be omitted. In such an embodiment, the distance d3 can be substantially zero, such that the first radiating element 110a' rests directly on the surface of the upper planar portion 122. In such a scenario, the physical dimensions of first radiating element 110a' can be less critical because the conductors forming the first radiating element effectively establish a galvanic electrical connection with the upper planar portion 122. This galvanic connection will substantially detune the first radiating element 110a', but it has been found that the mixing inlay 902 can still provide a mixing signal response with reduced attenuation under conditions similar to those described herein (at least as compared to a conventional inlay which lacks a conductive parasitic element as described). In other respects, the operation of the mixing inlay 902 is similar to the operation of the mixing inlays described with respect to FIGS. 1-4.

Applicants have presented herein certain theoretical aspects of the invention that are believed to be accurate and that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

The invention claimed is:

1. A re-radiating transponder, comprising:
   a first radiating element formed of a first planar conductive sheet aligned with a first plane and comprising a first leg of an antenna;
   a second radiating element formed of a second planar conductive sheet aligned with said first plane and comprising a second leg of said antenna;
   a non-linear mixing component connected between adjacent end portions of said first and second radiating elements, wherein said first radiating element, said second radiating element and said non-linear mixing component comprise a mixing inlay; and a conductive parasitic element positioned within a near field of said re-radiating transponder at a location spaced apart from said second radiating element and separated by a distance extending in a direction transverse to said first plane, wherein said distance is varied over a length of the conductive parasitic element; and wherein said mixing inlay is configured to receive a first exciter signal having a first frequency and a second exciter signal having a second frequency, and in response radiate a mixing product signal produced by said mixing inlay from said first and second exciter signal; and wherein at least one of said first and second legs of said antenna comprises (a) a first section of elongated form extending from said non-linear mixing component and having a narrow transverse dimension and (b) a second section extending from said first section having a wide transverse dimension that is wider than said narrow transverse dimension.

2. The re-radiating transponder according to claim 1, wherein said conductive parasitic element has a predetermined physical geometry including an overall length and overall width configured to provide a reduced attenuation of said mixing product signal produced by said mixing inlay under conditions where said re-radiating transponder is positioned on or adjacent to a conductive material.

3. The re-radiating transponder according to claim 2, wherein said conductive parasitic element is comprised of a lower planar portion which is disposed in a second plane having a parallel relationship with respect to said first plane.

4. The re-radiating transponder according to claim 3, wherein said lower planar portion is aligned with said second radiating element, and has a length and width dimension that are respectively at least substantially co-extensive with a length and width dimension of said second radiating element.

5. The re-radiating transponder according to claim 4, wherein said conductive parasitic element is further comprised of a transitional planar portion which extends in a direction from said second plane toward said first plane.

6. The re-radiating transponder according to claim 5, wherein said conductive parasitic element is further comprised of an upper planar portion extending from said transitional planar portion in a direction parallel to said first plane, and disposed between said first plane and said second plane.

7. The re-radiating transponder according to claim 6, wherein said upper planar portion is substantially aligned with said first radiating element, and has a length and width dimension that are respectively at least substantially co-extensive with a length and width dimension of said first radiating element.

8. A re-radiating transponder, comprising:

a first radiating element formed of a first planar conductive sheet aligned with a first plane and comprising a first leg of an antenna;

a second radiating element formed of a second planar conductive sheet aligned with said first plane and comprising a second leg of said antenna;

a non-linear mixing component connected between adjacent end portions of said first and second radiating elements, wherein said first radiating element, said second radiating element and said non-linear mixing component comprise a mixing inlay; and a conductive parasitic element positioned within a near field of said re-radiating transponder at a location spaced apart from said second radiating element and separated by a distance extending in a direction transverse to said first plane, wherein said distance is varied over a length of the conductive parasitic element; and wherein said mixing inlay is configured to receive a first exciter signal having a first frequency and a second exciter signal having a second frequency, and in response radiate a mixing product signal produced by said mixing inlay from said first and second exciter signal;

wherein said conductive parasitic element has a predetermined physical geometry including an overall length and overall width configured to provide a reduced attenuation of said mixing product signal produced by said mixing inlay under conditions where said re-radiating transponder is positioned on or adjacent to a conductive material;

wherein said conductive parasitic element is comprised of a lower planar portion which is disposed in a second plane having a parallel relationship with respect to said first plane;

wherein said lower planar portion is aligned with said second radiating element, and has a length and width dimension that are respectively at least substantially co-extensive with a length and width dimension of said second radiating element;

wherein said conductive parasitic element is further comprised of a transitional planar portion which extends in a direction from said second plane toward said first plane; and wherein said second conductive radiating element is comprised of a first section of elongated form extending from said nonlinear mixing component and having a narrow transverse dimension and a second section extending from said first section having a wide transverse dimension that is wider than said narrow transverse dimension.

9. The re-radiating transponder according to claim 8, wherein said lower planar portion of said conductive parasitic element has a lower parasitic element transverse dimension which is at least substantially equal to said wide transverse dimension.

10. The re-radiating transponder according to claim 9, wherein said transitional planar portion of said conductive parasitic element has a transitional parasitic element transverse dimension which is at least substantially equal to said wide transverse dimension.

11. The re-radiating transponder according to claim 10, wherein said conductive parasitic element is further comprised of an upper planar portion disposed between said first plane and said second plane and which extends from said transitional planar portion, and has an upper parasitic element transverse dimension which is at least substantially equal to said wide transverse dimension.

12. The re-radiating transponder according to claim 4, further comprising a dielectric spacer element disposed between said second conductive radiating element and said lower planar portion of said conductive parasitic element.

13. The re-radiating transponder according to claim 1, further comprising at least one structural member which is configured to provide rigidity to the mixing inlay.

14. The re-radiating transponder according to claim 1, wherein said conductive parasitic element is comprised of a conductive foil.

15. A method for reducing attenuation of a re-radiated signal produced by a re-radiating transponder, comprising:

disposing in a first plane (a) a first radiating element formed of a first planar conductive sheet and comprising a first leg of an antenna, and (b) a second radiating element formed of a second planar conductive sheet and comprising a second leg of the antenna;

providing a non-linear mixing component connected between adjacent end portions of said first and second radiating elements, said first and second radiating elements and said nonlinear component comprising a mixing inlay;

receiving at said mixing inlay a first exciter signal having a first frequency and a second exciter signal having a second frequency, and in response, radiating a mixing product signal produced by said mixing inlay from said first and second exciter signals;

reducing an attenuation of said mixing product under conditions where said re-radiating transponder is positioned on or adjacent to a conductive material by positioning a conductive parasitic element within a near field of said re-radiating transponder at a location disposed between said first plane and said conductive material, and varying a distance between said conductive parasitic element and said first plane over a length of said conductive parasitic element;

wherein at least one of said first and second legs of said antenna comprises (a) a first section of elongated form extending from said non-linear mixing component and having a narrow transverse dimension and (b) a second section extending from said first section having a wide transverse dimension that is wider than said narrow transverse dimension.

16. The method according to claim 15, wherein said conductive parasitic element is comprised of a lower planar portion and said method further comprises disposing said lower planar portion in a second plane having a parallel relationship with respect to said first plane.

17. The method according to claim 16, wherein said lower planar portion has a length and width dimension that are at least substantially equal to a length and width dimension of said second radiating element and said method further comprises positioning said lower planar portion so that said second radiating element is substantially within a boundary defined by a peripheral edge of said lower planar portion.

18. The method according to claim 16, wherein said distance is varied by providing a transitional planar portion of said conductive parasitic element which extends in a direction from said second plane toward said first plane.

19. The method according to claim 18, further comprising disposing between said first plane and the second plane an upper planar portion of said conductive parasitic element which extends from said transitional planar portion in a direction parallel to said first plane.

20. A re-radiating transponder, comprising:

a transponder base which includes an attachment surface configured to facilitate attachment of said transponder housing to an object which is to be monitored; and a mixing inlay disposed on the transponder base, said mixing inlay comprising a first radiating element, a second radiating element, and a non-linear mixing component connected between adjacent end portions of said first and second radiating elements, said mixing inlay configured to receive a first exciter signal having a first frequency and a second exciter signal having a second frequency, and in response, to radiate a mixing product signal produced by said mixing inlay from said first and second exciter signals;

wherein said mixing inlay further comprises a conductive parasitic element disposed within a near field of said re-radiating transponder at a location between a first plane defined by said first and second radiating elements and a second plane defined by said attachment surface of said housing, and having a distance provided between said conductive parasitic element and said first plane which varies over a length of said conductive parasitic element; and wherein said first radiating element comprises a first leg of an antenna and said second radiating element comprises a second leg of the antenna, and at least one of said first and second legs of said antenna comprises (a) a first section of elongated form extending from said non-linear mixing component and having a narrow transverse dimension and (b) a second section extending from said first section having a wide transverse dimension that is wider than said narrow transverse dimension.

* * * * *